(12) United States Patent
Hom et al.

(10) Patent No.: US 9,268,965 B2
(45) Date of Patent: *Feb. 23, 2016

(54) GATHERING, STORING AND USING REPUTATION INFORMATION

(71) Applicant: International Business Machines Corporation, Armonk, NY (US)

(72) Inventors: Richard V. Hom, Troy, MI (US); Eric M. Nelson, Durham, NC (US); David C. Roxin, Pikesville, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/315,545

(22) Filed: Jun. 26, 2014

(65) Prior Publication Data

US 2014/0310806 A1 Oct. 16, 2014

Related U.S. Application Data

(63) Continuation of application No. 12/897,062, filed on Oct. 4, 2010, now Pat. No. 8,800,029.

(51) Int. Cl.
*H04L 29/06* (2006.01)
*G06F 21/62* (2013.01)
*H04L 29/08* (2006.01)
(Continued)

(52) U.S. Cl.
CPC ............ *G06F 21/6245* (2013.01); *G06Q 10/10* (2013.01); *G06Q 50/01* (2013.01); *H04L 29/0685* (2013.01); *H04L 63/10* (2013.01); *H04L 63/105* (2013.01); *H04L 67/1057* (2013.01); *H04L 29/08378* (2013.01)

(58) Field of Classification Search
CPC .................... H04L 63/105; H04L 67/1057
See application file for complete search history.

(56) References Cited

U.S. PATENT DOCUMENTS

| 6,615,253 B1 | 9/2003 | Bowman-Amuah |
| 6,766,314 B2 | 7/2004 | Burnett |

(Continued)

OTHER PUBLICATIONS

Colombo et al., "Fine Grained Access Control with Trust and Reputation Management for Globus", 2007, pp. 1505-1515.*

(Continued)

*Primary Examiner* — Taghi Arani
*Assistant Examiner* — Thaddeus Plecha
(74) *Attorney, Agent, or Firm* — Noah A. Sharkan; Maxine L. Barasch; Keohane & D'Alessandro PLLC (57) ABSTRACT

Approaches for using the historical party reputation data to calculate an access decision rating are provided. Specifically, one or more approaches provide a method, including: collecting reputation information of a first user that is requesting access to one or more assets, the reputation information based on at least an association of the first user with an organization and an association of the first user with one or more other users associated with one or more other organizations; storing the requester's reputation information; determining a change in the requester's reputation information, wherein the change comprises at least one of: the first user forming a new association with another organization, and the first user forming a new association with a second user, wherein the second user is affiliated with another organization; and causing an access decision rating to be calculated based upon the determined change in the requester's reputation information.

19 Claims, 4 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 7,461,051 B2 | 12/2008 | Lavine | |
| 7,552,110 B2 | 6/2009 | Hrle et al. | |
| 7,568,097 B2 | 7/2009 | Burnett | |
| 7,698,255 B2 | 4/2010 | Goodwin et al. | |
| 7,698,303 B2 | 4/2010 | Goodwin et al. | |
| 7,725,492 B2 | 5/2010 | Sittig et al. | |
| 7,779,156 B2 | 8/2010 | Alperovitch et al. | |
| 7,870,203 B2 | 1/2011 | Judge et al. | |
| 7,937,480 B2 | 5/2011 | Alperovitch et al. | |
| 8,010,460 B2 | 8/2011 | Work et al. | |
| 8,021,163 B2 | 9/2011 | Forman | |
| 8,027,975 B2 | 9/2011 | Gabriel et al. | |
| 8,214,497 B2 | 7/2012 | Alperovitch et al. | |
| 8,359,328 B2 | 1/2013 | Hom et al. | |
| 8,800,029 B2 * | 8/2014 | Horn et al. | 726/21 |
| 8,805,881 B2 | 8/2014 | Hom et al. | |
| 2002/0103801 A1 | 8/2002 | Lyons | |
| 2002/0147706 A1 | 10/2002 | Burnett | |
| 2003/0083891 A1 | 5/2003 | Lang et al. | |
| 2005/0005079 A1 | 1/2005 | Boudou et al. | |
| 2005/0198031 A1 | 9/2005 | Pezaris et al. | |
| 2005/0216300 A1 | 9/2005 | Appelman et al. | |
| 2006/0042483 A1 | 3/2006 | Work et al. | |
| 2006/0212931 A1 | 9/2006 | Shull et al. | |
| 2007/0006326 A1 | 1/2007 | Redlich et al. | |
| 2007/0101436 A1 | 5/2007 | Redlich et al. | |
| 2007/0255753 A1 | 11/2007 | Pomerantz | |
| 2008/0005223 A1 | 1/2008 | Flake et al. | |
| 2008/0141366 A1 | 6/2008 | Cross et al. | |
| 2008/0175266 A1 | 7/2008 | Alperovitch et al. | |
| 2008/0183538 A1 | 7/2008 | Hamadi et al. | |
| 2008/0183700 A1 * | 7/2008 | Gabriel et al. | 707/5 |
| 2008/0243933 A1 | 10/2008 | Herm | |
| 2008/0281807 A1 | 11/2008 | Bartlang et al. | |
| 2009/0024489 A1 | 1/2009 | Baldua et al. | |
| 2009/0024574 A1 | 1/2009 | Timmons | |
| 2009/0187442 A1 | 7/2009 | Kohanim et al. | |
| 2009/0204471 A1 | 8/2009 | Elenbaas et al. | |
| 2009/0228294 A1 | 9/2009 | Choi et al. | |
| 2009/0265551 A1 | 10/2009 | Tripunitara et al. | |
| 2009/0300720 A1 | 12/2009 | Guo et al. | |
| 2010/0005099 A1 | 1/2010 | Goodman et al. | |
| 2010/0064362 A1 | 3/2010 | Materna et al. | |
| 2010/0077445 A1 | 3/2010 | Schneider et al. | |
| 2010/0114744 A1 * | 5/2010 | Gonen | 705/35 |
| 2010/0293016 A1 | 11/2010 | Spektor et al. | |
| 2011/0173084 A1 | 7/2011 | Cheng et al. | |
| 2011/0185436 A1 | 7/2011 | Koulinitch et al. | |
| 2011/0214174 A1 | 9/2011 | Herzog et al. | |
| 2011/0252483 A1 | 10/2011 | Cross et al. | |
| 2011/0276604 A1 | 11/2011 | Hom et al. | |
| 2012/0036127 A1 | 2/2012 | Work et al. | |
| 2012/0124033 A1 | 5/2012 | Gabriel et al. | |
| 2015/0188926 A1 | 7/2015 | Hom et al. | |

OTHER PUBLICATIONS

Pujol, J.M. et al., "Extracting Reputation in Multi Agent Systems by Means of Social Network Topology", Proceedings of the First International Joint Conference on Autonomous Agents and Multiagent Systems, Jul. 15-19, 2002, Bologna, Italy. Publisher: ACM Press, pp. 467-474.

Krukow et al., "A Framework for Concrete Reputation-Systems with Applications to History-Based Access Control", 2005, 99. 260-269.
Donovan Artz et al., "A survey of trust in computer science and the Semantic Web", Web Semantics: Science, Services and Agents on the World Wide Web 5 (2007) pp. 58-71.
Eric Yuan et al., "Attributed Based Access Control (ABAC) for Web Services", Proceedins of the IEEE International Conference on Web Services (ICWS'05), 9 pages.
Li Yang et al., "Integrating Dirichlet Reputation into Usage Control", CSIIRW '09, Apr. 13-15, Oak Ridge, Tennessee, Copyright 2009, 14 pages.
Philip J. Windley, Ph.D., et al., "Using Reputation to Augment Explicit Authorization", DIM '07, Nov. 2, 2007, Fairfax, Virginia, Copyright 2007, pp. 72-81.
Hassan Takabi et al., "Trust-Based User-Role Assignment in Role-Based Access Control", IEEE AICCSA (2007), pp. 807-814.
Jason Crampton et al., "Towards an Access-Control Framework for Countering Insider Threats", Copyright 2010, pp. 173-195.
Jennifer Golbeck et al., "Accuracy of Metrics for Inferring Trust and Reputation in Semantic Web-Based Social Networks", 2004, Appearing in Engineering Knowledge in the Age of the Semantic Web, Springer-verlag Berlin Heidelberg Publisher, pp. 116-131.
Scott A. Waldron, USPTO Office Action, U.S. Appl. No. 12/775,410, Mail Date Jul. 17, 2012, 37 pages.
Scott A. Waldron, USPTO Final Office Action, U.S. Appl. No. 12/775,410, Mail Date Dec. 31, 2012, 31 pages.
Scott A. Waldron, USPTO Office Action, U.S. Appl. No. 12/775,410, Notification Date Nov. 15, 2013, 37 pages.
Scott A. Waldron, USPTO Final Office Action, U.S. Appl. No. 12/775,410, Notification Date Feb. 28, 2014, 37 pages.
Scott A. Waldron, USPTO Notice of Allowance and Fee(s) Due, U.S. Appl. No. 12/775,410, Date Mailed Mar. 26, 2014, 31 pages.
Frantz Coby, USPTO Notice of Allowance and Fee(s) Due, U.S. Appl. No. 12/815,431, Date Mailed Sep. 17, 2012, 9 pages.
Eskandarnia, USPTO Office Action, U.S. Appl. No. 12/862,030, Date Mailed Sep. 13, 2012, 16 pages.
Eskandarnia, USPTO Office Action, U.S. Appl. No. 12/862,030, Date Mailed Feb. 15, 2013, 11 pages.
U.S. Appl. No. 14/315,397, Office Action, Oct. 7, 2014, 10 pages.
U.S. Appl. No. 14/315,397, Notice of Allowance dated Dec. 9, 2014, 7 pages.
U.S. Appl. No. 14/641,501, Office Action dated Apr. 21, 2015, 22 pages.
Galstyan et al., "Is Guilt by Association a Bad Thing?", Feb. 15, 2005, In Proceedings of the First International Conference on Intelligence Analysis, 6 pages.
MacSkassy et al., "Suspicion scoring based on guilt-by-association, collective inference, and focused data access", Annual Conference of the North American Association for Computational Social and Organizational Science (NAACSOS), 2005.
U.S. Appl. No. 12/862,030, Notice of Allowance dated Aug. 25, 2014, 28 pages.
U.S. Appl. No. 12/897,062, Office Action dated Jun. 13, 2012, 19 pages.
U.S. Appl. No. 12/897,062, Final Office Action dated Sep. 12, 2012, 20 pages.
U.S. Appl. No. 12/897,062, Office Action dated May 28, 2013, 30 pages.
U.S. Appl. No. 12/897,062, Final Office Action dated Oct. 8, 2013, 22 pages.
U.S. Appl. No. 12/897,062, Notice of Allowance dated Mar. 26, 2014, 44 pages.
U.S. Appl. No. 14/641,501, Notice of Allowance dated Aug. 3, 2015, 16 pages.

* cited by examiner

GATHERING, STORING AND USING REPUTATION INFORMATION

RELATED APPLICATIONS

The following applications, commonly-owned with this one, are related and hereby incorporated by reference in its entirety for all purposes: U.S. patent application Ser. No. 12/775,410, filed on May 6, 2010, entitled "Reputation Based Access Control", and; U.S. patent application Ser. No. 12/815,431, filed on Jun. 16, 2010, entitled "Party Reputation Aggregation System And Method", and; and U.S. patent application Ser. No. 12/862,030, filed on Aug. 24, 2010, entitled "Data System Forensics System And Method". Furthermore, this application is a continuation of U.S. patent application Ser. No. 12/897,062, filed on Oct. 4, 2010, entitled "Gathering, Storing, and Using Reputation Information".

BACKGROUND

1. Field of the Invention

This invention relates generally to mobile device graphical interface technologies and, more specifically, to controlling inadvertent inputs to an input area of a mobile device.

2. Description of the Related Art

Many times, there is a need to assess the reputation, qualities or attributes of an individual or an organization such as a social networking organization. Some examples of times where it is desirable to assess an individual's or an organization's reputation, qualities or attributes may be when an individual or an organization is requesting physical access (e.g., to a building or a secured area within a building, to use a bulldozer or other power equipment, etc.) or electronic access (e.g., to a secured database or application on a server). For instance, it may be useful to understand the individual's skill level at a particular task, such as the individual's skill at operating a dangerous power tool or the individual's skill at programming in Java® programming language. Relevant information may include certifications received by the individual, peer reviews of the individual by his peers, an expert opinion of the individual's skill at that task, security level, the individual's activity history (e.g., as to whether the individual performed well in the past in a particular task), the individual's associations with organizations (e.g., programmers' user groups, social groups, social networking organizations, etc.) and individual's relationships with other individuals (e.g., father-son, attorney-client, friend-friend, etc.).

However, presently, this type of information may be dispersed across many different, possibly unconnected information stores. It is possible that present data systems, including such directory services as Lightweight Directory Access Protocol (LDAP)—like directory services, e.g., Microsoft® LDAP software or Microsoft Active Directory® software, do not maintain a history for an individual or an organization. Further, it may be that no history on artifacts is kept in many content management systems (CMSs) that integrate/interface with LDAP-like directory services. Further yet, there may be no mechanism for tracking an individual's or organization's pedigree/reputation/reliability/trustworthiness factors or one that has history for the same.

There is a problem where a party comes/goes/comes/goes, etc., to/from an enterprise to gathering, storing and using a running history of parties' attributes/reputations when, e.g., a party may come/go/come/go and attributes/reputation change in the meantime to calculate an access decision rating, especially over disparate data sources. In the case of an enterprise, individuals may enter and leave the enterprise over time. As such, security may be granted on a temporal basis only such that there may be a lack of historical recording that tells of an individual's security life cycle in the enterprise. Moreover, this gap may leave the individual's social network absent from the individual's security life cycle model at each interval that they are active in the enterprise. This may be important because, when an individual is determined to be "unreliable" for any reason, it may prove valuable to trace through any and all relationships that point to the source at any time, past and/or present, for finding "human security holes."

SUMMARY OF THE INVENTION

Approaches for using the historical party reputation data to calculate an access decision rating are provided. Specifically, one or more approaches provide a method, including: collecting reputation information of a first user that is requesting access to one or more assets, the reputation information based on at least an association of the first user with an organization and an association of the first user with one or more other users associated with one or more other organizations; storing the requester's reputation information; determining a change in the requester's reputation information, wherein the change comprises at least one of: the first user forming a new association with another organization, and the first user forming a new association with a second user, wherein the second user is affiliated with another organization; and causing an access decision rating to be calculated based upon the determined change in the requester's reputation information.

In one approach, provided is a method comprising: collecting, using at least one computing device, reputation information of a first user that is requesting access to one or more assets, the reputation information based on at least an association of the first user with an organization and an association of the first user with one or more other users associated with one or more other organizations; storing the requester's reputation information; determining, using the at least one computing device, a change in the requester's reputation information, wherein the change comprises at least one of: the first user forming a new association with another organization, and the first user forming a new association with a second user, wherein the second user is affiliated with another organization; and causing an access decision rating to be calculated based upon the determined change in the requester's reputation information.

In another approach, provided is a computer-readable storage device storing computer instructions, which, when executed, enables a computer system operating with a reputation provider for collecting and maintaining historical party reputation data and for using the historical party reputation data to calculate an access decision rating, the computer-readable storage medium storing computer instructions comprising: collecting reputation information of a first user that is requesting access to one or more assets, the reputation information based on at least an association of the first user with an organization and an association of the first user with one or more other users associated with one or more other organizations; storing the requester's reputation information; determining a change in the requester's reputation information, wherein the change comprises at least one of: the first user forming a new association with another organization, and the first user forming a new association with a second user, wherein the second user is affiliated with another organization; and causing an access decision rating to be calculated based upon the determined change in the requester's reputation information.

In yet another approach, provided is a computer system for collecting and maintaining historical party reputation data and for using the historical party reputation data to calculate an access decision rating and recalculating the access decision rating when the historical party reputation data has changed, the system comprising: a memory medium comprising instructions; a bus coupled to the memory medium; and a processor coupled to the bus that when executing the instructions causes the computer system to: collect reputation information of a first user that is requesting access to one or more assets, the reputation information based on at least an association of the first user with an organization and an association of the first user with one or more other users associated with one or more other organizations; store the requester's reputation information; determine a change in the requester's reputation information, wherein the change comprises at least one of: the first user forming a new association with another organization, and the first user forming a new association with a second user, wherein the second user is affiliated with another organization; and cause an access decision rating to be calculated based upon the determined change in the requester's reputation information.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

The present invention, which meets the needs identified above, provides for a method and a system for collecting and maintaining historical party reputation data and for using the historical party reputation data to calculate an access decision rating and recalculating the access decision rating when the historical party reputation data has changed.

Many different data systems store, organize and provide access to data, such as those using the LDAP protocol. Lightweight Directory Access Protocol, or LDAP, is an application protocol for querying and modifying data using directory services running over TCP/IP. A directory service is simply the software system that stores, organizes and provides access to information in a directory. A directory is a set of objects with attributes organized in a logical and hierarchical manner. As an example, Microsoft Active Directory® software and technology is a technology created by Microsoft Corporation that provides a variety of network services, including LDAP-like directory services. There are other directory services software products and other protocols and these are noted as examples.

Figure 1:
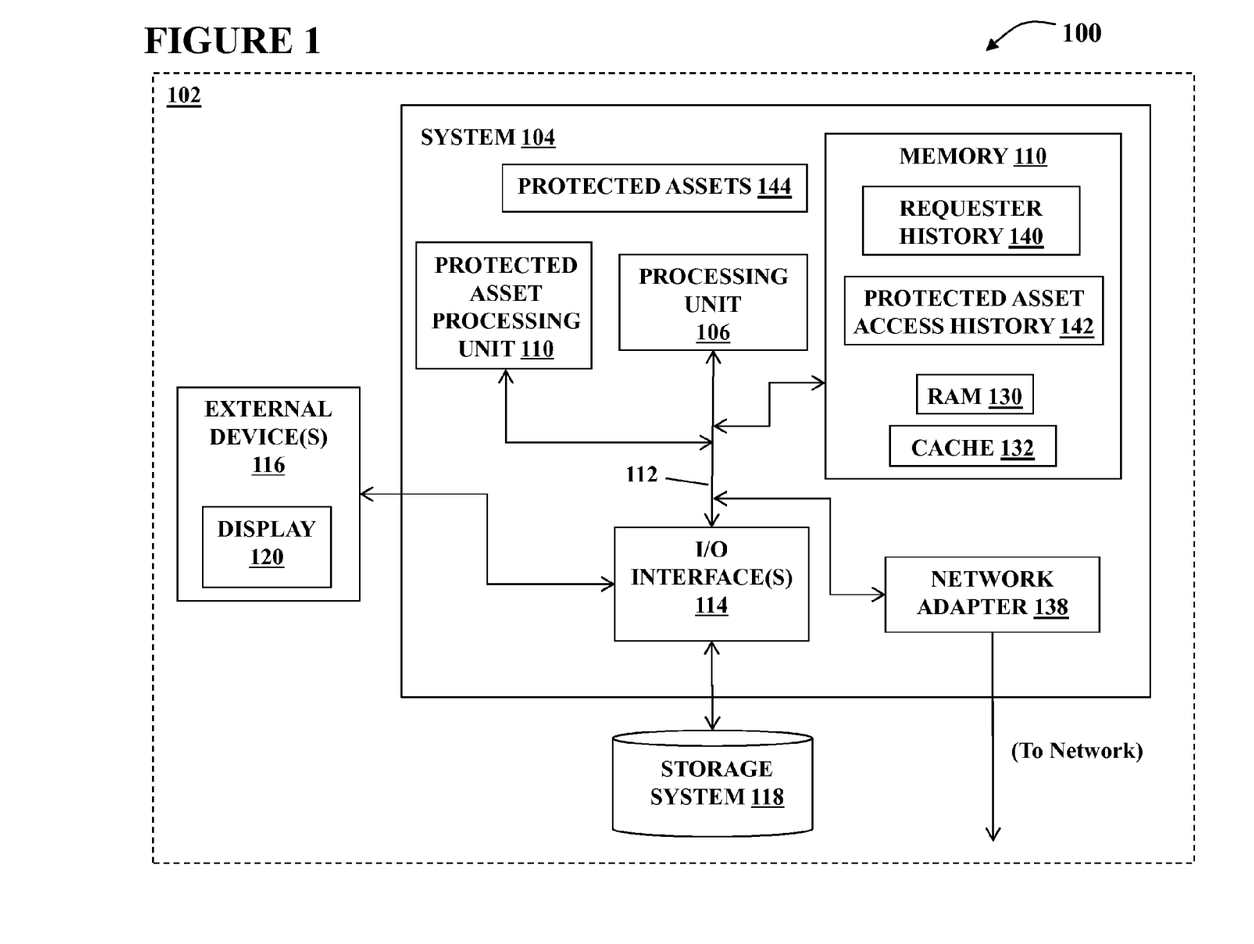
FIG. 1 shows a data processing system suitable for implementing an embodiment of a system for collecting and maintaining historical party reputation data and for using the historical party reputation data to calculate an access decision rating of the present invention.

A data processing system 100, such as data processing system 102 shown in FIG. 1, suitable for storing and/or executing program code of the present invention may include historical party reputation data collection system 104 having at least one processor (processing unit 106) coupled directly or indirectly to memory 110 through system bus 112. Memory 110 may include local memory (RAM 130) employed during actual execution of the program code and cache memories (cache 132) that provide temporary storage of at least some program code in order to reduce the number of times code must be retrieved from bulk storage 118, connected to historical party reputation data collection system 104, during execution. Memory 110 may further include requester history storage 140 for collecting and storing a history of a requester and protected asset access history storage 142 for storing the access history of protected assets. Protected assets 144 are those assets that have restricted access and are allowed access only to certain requesters, based upon the requesters' reputation, such as security clearance, etc.

Input/output or I/O devices (external peripherals 116) (including but not limited to keyboards, displays (display 120), pointing devices, etc.) can be coupled to historical party reputation data collection system 104 either directly or indirectly through a network (see FIG. 2) through intervening I/O controllers (I/O interface(s) 114). Historical party reputation data collection system 104 may also include protected asset processing unit 110 coupled to system bus 112. Requests or queries sent by protected asset processing unit 110 may be manually created by, such as, keying in a query on a keyboard (external peripheral(s) 114) and transmitting to data system forensics system 104 or, alternatively, may be automatically generated by a separate computer, e.g., and transmitting to historical party reputation data collection system 104.

Figure 2:
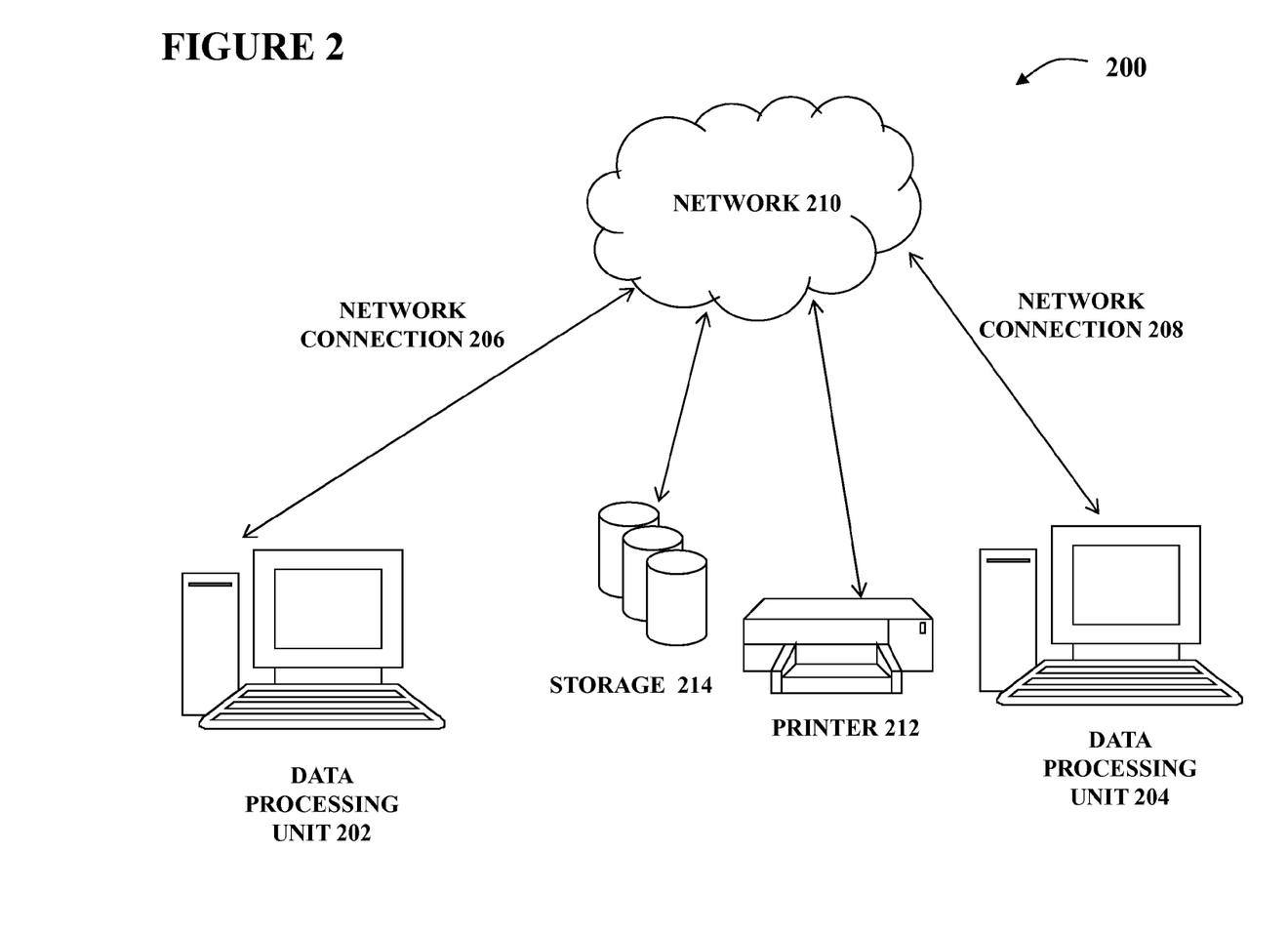
FIG. 2 shows a network that may incorporate an embodiment of the present invention.

Network adapters (network adapter 138 in FIG. 1) may also be utilized in system 200 to enable data processing units (as shown in FIG. 2, data processing unit 202) to become coupled through network connections (network connections 206, 208) to other data processing units (data processing unit 204), remote printers (printer 212) and/or storage devices (storage 214) or other devices through intervening private and/or public networks (network 210).

Figure 3:
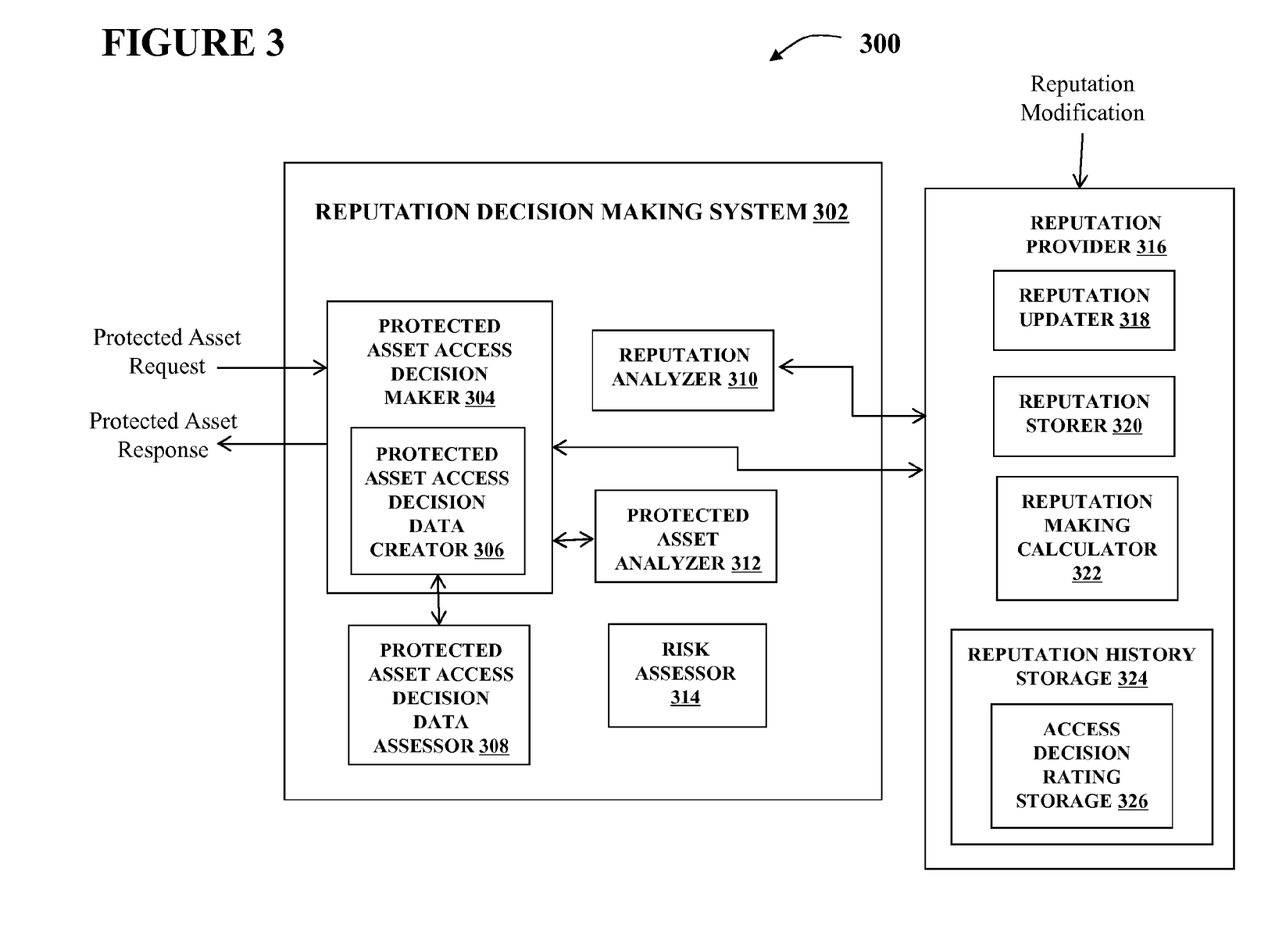
FIG. 3 illustrates a system of the present invention for collecting and maintaining historical party reputation data and for using the historical party reputation data to calculate an access decision rating and recalculating the access decision rating when the historical party reputation data has changed has a reputation updater for updating a reputation.

FIG. 3 illustrates system 300 having reputation decision making system 302 that may include protected asset access decision maker 304 for receiving requests and providing responses to access protected assets 144 (FIG. 1) from requesters, each having a reputation that may be stored in reputation provider 316, such as a security clearance, associations with various organizations, whether the requestor's family members work for competitors, etc. Reputation provider 316 may receive reputation modifications when the reputation of a requester changes, such as when a requester associates with an organization, when a requester gets married to a person who works for a competitor, etc. Reputation provider 316 may have reputation updater 318 for updating the reputation of a party when the party's reputation changes and reputation storer 320 for storing the party's reputation before and after changes. Reputation provider 316 may further have access reputation making calculator (decision making rating maker) 322. Reputation making calculator 322 analyzes each party's reputation to create an access decision rating. The access decision rating may be used to determine a party's ability to access protected assets. The access decision rating may be based upon the party's security clearance, associations with various organizations, whether the requestor's family members work for competitors, etc., as compared against protected asset decision requirements. The access decision rating may be used by protected asset access decision maker 304 to make a decision as to whether the protected asset may be accessed by a requesting party (requester).

Reputation provider 316 may further have reputation history storage unit 324 for storing the reputation history of each party and each party's access decision rating in access decision rating storage 326. Access decision ratings are forwarded to reputation analyzer 310.

Reputation analyzer 310 works with protected asset analyzer 312 to analyze the reputation of the requester and access decision rating as in accordance to the policy to access the requested protected asset. Risk assessor 314 may be utilized to assess risk associated with the requester accessing the protected asset. Protected asset access decision maker 304 may make access decisions as to whether a particular requester who has requested access to a particular protected asset. Protected asset access decision maker 304 may utilize protected asset access data assessor 308 to determine whether a particular requester is entitled to access the requested protected asset. Protected asset access decision data creator 306 creates and stores access decision data representing the decision making process by protected asset access decision maker 304. This access decision data may be used by protected asset access decision data assessor 308 to assess the decision making process made by reputation decision making system 302.

Figure 4:
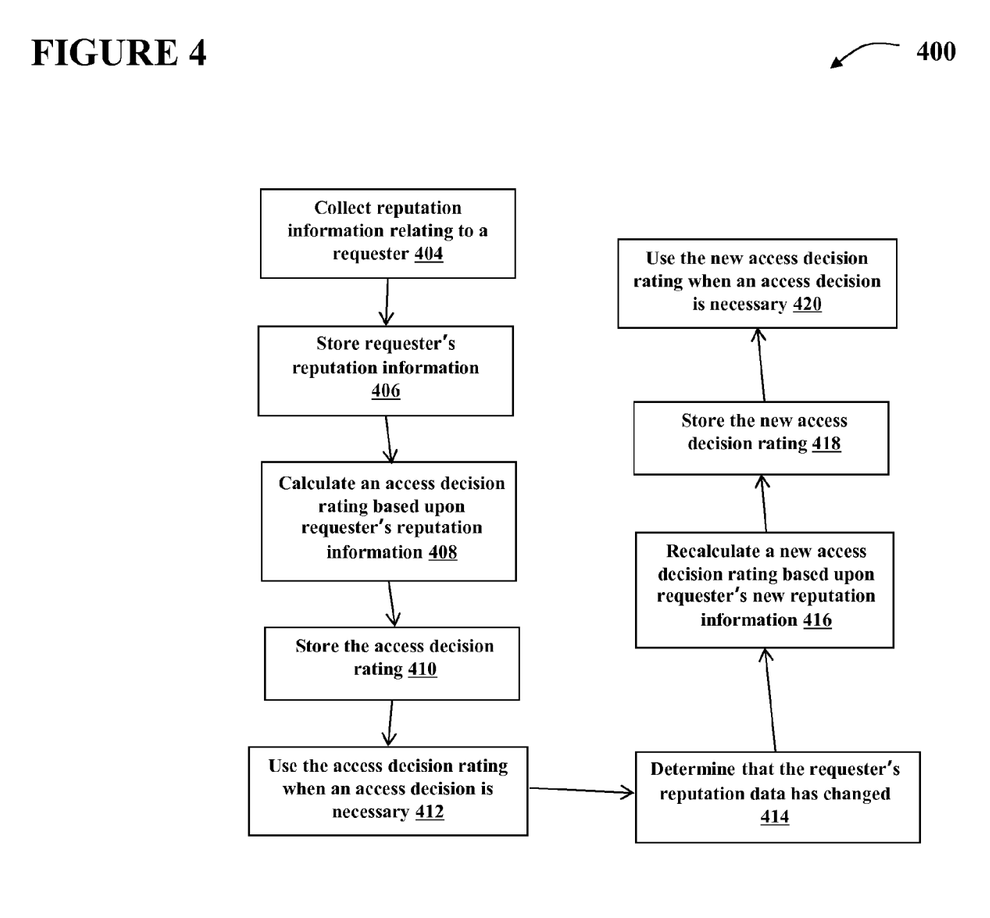
FIG. 4 illustrates a method of the present invention for collecting and maintaining historical party reputation data and for using the historical party reputation data to calculate an access decision rating and recalculating the access decision rating when the historical party reputation data has changed.

FIG. 4 illustrates an information collection method 400 of the present invention, beginning at 404 where information related to a requester, that is, a party, i.e., an individual or even a network, (requester's reputation) is collected. At 406, the requester's reputation (requester information) is stored. At 408, an access decision (reputation) rating is calculated based upon the requester's reputation. The access decision rating can be used to assess the access decision process by protected asset access decision data assessor 308 (FIG. 3). At 410, the access decision rating may be stored for later access. At 412, the access decision rating may be used for an access decision based upon a request from the requester for a protected asset. At 414, it may be determined that the requester's reputation has changed. At 416, the access decision rating is recalculated so that a new access decision rating is determined based upon the changed requester's reputation and is stored at 418. At 420, the new access decision rating is used when the requester makes an access request for a protected asset.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for collecting and maintaining historical party reputation data and for using the historical party reputation data to calculate an access decision rating and recalculating the access decision rating when the historical party reputation data has changed has a reputation updater for updating a reputation, it is understood that the invention further provides various alternative embodiments. For example, in one embodiment, the invention provides a computer-readable/useable medium that includes computer program code to enable a system for collecting and maintaining historical party reputation data and for using the historical party reputation data to calculate an access decision rating and recalculating the access decision rating when the historical party reputation data has changed has a reputation updater for updating a reputation. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium comprises program code embodied on one or more portable storage articles of manufacture (e.g., a compact disc, a magnetic disk, a tape, etc.), and on one or more data storage portions of a computing device, such as memory and/or storage system (e.g., a fixed disk, a read-only memory, a random access memory, a cache memory, etc.).

In another embodiment, the invention provides a computer-implemented method for collecting and maintaining historical party reputation data and for using the historical party reputation data to calculate an access decision rating and recalculating the access decision rating when the historical party reputation data has changed has a reputation updater for updating a reputation. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a solution integrator, could offer to deploy a computer infrastructure for collecting and maintaining historical party reputation data and for using the historical party reputation data to calculate an access decision rating and recalculating the access decision rating when the historical party reputation data has changed has a reputation updater for updating a reputation. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing security for one or more computerized assets, the method comprising:
    collecting, from disparate data sources by at least one computing device, reputation information of a first user that is requesting access to the one or more computerized assets, the reputation information based on at least an association of the first user with a first organization and an association of the first user with one or more other users associated with at least one second organization;
    storing, by the at least one computing device, the first user's reputation information in a memory storage device;
    determining, by the at least one computing device, a change in the first user's reputation information, wherein the change comprises at least one of: the first user forming a first new association with an organization other than the first organization, or the first user forming a second new association with a second user, wherein the second user is affiliated with the organization other than the first organization; and
    causing, by the at least one computing device, an access decision rating to be calculated based upon the determined change in the first user's reputation information.

2. The method as defined in claim 1 further comprising accessing, using the at least one computing device, the access decision rating when an access decision is necessary.

3. The method as defined in claim 1 further comprising storing, using the at least one computing device, the access decision rating calculated based upon the determined change in the first user's reputation information.

4. The method as defined in claim 1 further comprising calculating, using the at least one computing device, an initial access decision rating based upon the first user's collected reputation information prior to calculating the access decision rating based upon the determined change in the first user's reputation information.

5. The method as defined in claim 4, further comprising storing, using the at least one computing device, the initial access decision rating that is based upon the first user's collected reputation information.

6. The method as defined in claim 1, wherein the second user has a familial relationship with the first user.

7. A computer-readable storage device storing computer instructions, which, when executed, enables a computer system to manage security for one or more computerized assets, the computer-readable storage device storing computer instructions comprising:
    collecting, from disparate data sources, reputation information of a first user that is requesting access to the one or more computerized assets, the reputation information based on at least an association of the first user with an organization and an association of the first user with at least one second organization;
    storing the first user's reputation information in a memory storage device;
    determining a change in the first user's reputation information, wherein the change comprises at least one of: the first user forming a first new association with an organization other than the first organization, or the first user forming a second new association with a second user, wherein the second user is affiliated with the organization other than the first organization; and
    causing an access decision rating to be calculated based upon the determined change in the first user's reputation information.

8. The computer-readable storage device of claim 7, wherein the computer instructions further comprise accessing the access decision rating when an access decision is necessary.

9. The computer-readable storage device of claim 7, wherein the computer instructions further comprise storing the access decision rating calculated based upon the determined change in the first user's reputation information.

10. The computer-readable storage device of claim 7, wherein the computer instructions further comprise calculating an initial access decision rating based upon the first user's collected reputation information prior to calculating the access decision rating based upon the determined change in the first user's reputation information.

11. The computer-readable storage device of claim 10, wherein the computer instructions further comprise storing the initial access decision rating that is based upon the first user's collected reputation information.

12. The computer-readable storage device of claim 7, wherein the second user has a familial relationship with the first user.

13. A computer system for managing security for one or more computerized, the system comprising:
    a memory medium comprising instructions;
    a bus coupled to the memory medium; and
    a processor coupled to the bus that when executing the instructions causes the computer system to:
        collect, from disparate data sources, reputation information of a first user that is requesting access to the one or more computerized assets, the reputation information based on at least an association of the first user with an organization and an association of the first user with at least one second organization;
        store the first user's reputation information in a memory storage device;
        determine a change in the first user's reputation information, wherein the change comprises at least one of: the first user forming a first new association with an organization other than the first organization, or the first user forming a second new association with a second user, wherein the second user is affiliated with the organization other than the first organization; and
        cause an access decision rating to be calculated based upon the determined change in the first user's reputation information.

14. The computer system of claim 13, wherein the instructions further cause the computer system to access the access decision rating when an access decision is necessary.

15. The computer system of claim 13, wherein the instructions further cause the computer system to store the access decision rating calculated based upon the determined change in the first user's reputation information.

16. The computer system of claim 13, wherein the instructions further cause the computer system to calculate an initial access decision rating based upon the first user's collected reputation information prior to calculating the access decision rating based upon the determined change in the first user's reputation information.

17. The computer system of claim 16, wherein the instructions further cause the computer system to store the initial access decision rating that is based upon the first user's collected reputation information.

18. The computer system of claim 13, wherein the second user has a familial relationship with the first user.

19. The computer system of claim 13, wherein the second user is the first user's spouse.

* * * * *